(12) United States Patent
Teramachi et al.

(10) Patent No.: US 6,700,228 B2
(45) Date of Patent: Mar. 2, 2004

(54) LINEAR MOTOR SYSTEM AND DRIVING APPARATUS DRIVEN BY SAME

(75) Inventors: Akihiro Teramachi, Tokyo-to (JP); Takeki Shirai, Tokyo-to (JP); Kaoru Hoshide, Tokyo-to (JP)

(73) Assignee: THK Co., Ltd., Tokyo (JP)

( * ) Notice: Subject to any disclaimer, the term of this patent is extended or adjusted under 35 U.S.C. 154(b) by 50 days.

(21) Appl. No.: 10/022,265

(22) Filed: Dec. 20, 2001

(65) Prior Publication Data

US 2002/0079747 A1 Jun. 27, 2002

(30) Foreign Application Priority Data

Dec. 21, 2000 (JP) .......................................... 2000-388444

(51) Int. Cl.[7] .............................................. H02K 45/00
(52) U.S. Cl. .......................................... 310/12; 310/12
(58) Field of Search ............................................ 310/12

(56) References Cited

U.S. PATENT DOCUMENTS 6,357,359 B1 * 3/2002 Davey et al. ................ 104/282
6,326,708 B1 * 12/2002 Tsuboi et al. .................. 310/12

* cited by examiner

Primary Examiner—Nicholas Ponomarenko
Assistant Examiner—Iraj A. Mohandesi
(74) Attorney, Agent, or Firm—Armstrong, Westerman & Hattori, LLP

(57) ABSTRACT

A linear motor system for a driving apparatus comprises a first linear motor having a primary side to which either one of first and second movable elements which are relatively movable with respect to each other, and a secondary linear motor having a secondary side mounted to this one of first and second movable elements so as to extend in the relatively movable direction to be continuous to the primary side of the first linear motor. The second linear motor has a primary side mounted to another one of the first and second movable elements, and the first linear motor also has a secondary side mounted to the another one of the first and second movable elements so as to extend in the relatively movable direction to be continuous to the primary side of the second linear motor.

12 Claims, 14 Drawing Sheets

LINEAR MOTOR SYSTEM AND DRIVING APPARATUS DRIVEN BY SAME

BACKGROUND OF THE INVENTION

The present invention relates to a linear motor system and a driving apparatus driven by the linear motor system as a driving source.

In recent technology, a positioning table for performing a positioning through guidance of a linear motion of a table has been widely utilized for, or applied to, machine tools, industrial robots, and like, machines or mechanisms.

According to an increased requirement for operating the table at a high speed, a linear motor has been often utilized in place of a ball screw as a driving source. In general, the linear motor is provided with a movable element as a primary side and a stator as a secondary side. The primary movable element is given a thrust (force) by the change of a field (magnetic field) and then linearly moves on the secondary side stator.

In order to move the table fast, it is desired for the linear motor to generate a large thrust force. There is known, as a linear motor having an increased large thrust force, a linear motor in which a pair of primary movable elements disposed on both sides of a single secondary stator so as to sandwich the same therebetween.

However, in such a known type linear motor, since the primary movable elements are arranged on both sides of the secondary stator, the thickness thereof is increased accordingly, which is not advantageous.

SUMMARY OF THE INVENTION

An object of the present invention is to substantially eliminate the defect or drawback encountered in the prior art and to provide a linear motor system capable of generating a large thrust force without increasing the thickness of the structure thereof and also provide a driving apparatus provided with such linear motor system as a driving source.

This and other objects can be achieved according to the present invention by providing, in one aspect, a linear motor system comprising:

a first linear motor having a primary side being mounted to either one of first and second movable elements which are relatively movable with respect to each other; and a secondary linear motor having a secondary side mounted to this one of first and second movable elements so as to extend in the relatively movable direction to be continuous to the primary side of the first linear motor, the second linear motor having a primary side mounted to another one of the first and second movable elements, and the first linear motor having a secondary side mounted to the another one of the first and second movable elements so as to extend in the relatively movable direction to be continuous to the primary side of the second linear motor.

According to the structure of the linear motor system of this aspect, since two linear motors are accommodated, the thrust force can be increased twice. Moreover, the excitation is made average to thereby operate the system more smoothly. Furthermore, since the second linear motor is assembled to the first linear motor in a reversed manner, the thickness of the entire structure of the linear motor system can be effectively made thin.

In a preferred embodiment of this aspect, the first and second linear motors are composed of linear induction motors or linear pulse motors, respectively, in which the secondary sides of the respective linear induction motors are arranged so as to oppose to each other.

The first and second movable elements may be composed of outer and inner rail members which are relatively movably fitted to each other, and the first and second linear motors are arranged between the outer and inner rail members.

In a case where linear D.C. motors are used for the first and second linear motors in the above linear motor system, in which a distance between the secondary side magnets is short, there may be caused a defect of operation because of the generation of an A.C. magnetic field between magnets. According to the preferred embodiment of the above aspect of the present invention, however, a linear induction motor or linear pulse motor having no magnet means is utilized as the secondary side, so that no alternating magnetic field is generated. However, a linear D.C. motor may be utilized as far as there is adopted a structure in which the distance between the secondary sides of the first and second linear motors can be made relatively large.

In another aspect of the present invention, there is provided a driving apparatus comprising:

first and second movable elements which are relatively movable with respect to each other; and a driving unit for giving driving power to the first and second movable elements, the driving unit comprising a linear motor system, which comprises:

a first linear motor having a primary side being mounted to either one of the first and second movable elements which are relatively movable with respect to each other; and a secondary linear motor having a secondary side mounted to this one of the first and second movable elements so as to extend in the relatively movable direction to be continuous to the primary side of the first linear motor, the second linear motor having a primary side mounted to another one of the first and second movable elements, and the first linear motor having a secondary side mounted to the another one of the first and second movable elements so as to extend in the relatively movable direction to be continuous to the primary side of the second linear motor.

According to the structure of this driving apparatus, since two linear motors are accommodated, the thrust force can be increased twice. Furthermore, since the improved linear motor system is provided, the excitation is made average to thereby operate the system more smoothly, and since the second linear is assembled to the first linear motor in a reversed manner, the thickness of the entire structure of the linear motor system can be effectively made thin.

In a preferred embodiment of this aspect, the driving apparatus may further comprises first and second guide units for guiding the second movable element in the relatively movable direction with respect to the first movable element, the first guide unit being provided for the first movable element and the second guide unit being provided for the second movable element, and wherein the first linear motor generates a thrust force at a position which is substantially the same position of the first guide unit in the relatively movable direction, and the second linear motor generates a thrust force at a position which is substantially the same position of the second guide unit in the relatively movable direction.

The primary side of the first linear motor is operatively connected to the first movable element, the first guide unit is fixed to the first movable element at a portion in a vicinity of the primary side of the first linear motor in the relatively movable direction, and the primary side of the second linear motor is operatively connected to the second movable element, and the second guide unit is fixed to the second movable element at a portion in a vicinity of the primary side of the second linear motor in the relatively movable direction.

The first and second linear motors are composed of linear induction motors or linear pulse motors respectively, in which the secondary sides of the respective linear induction motors are arranged so as to oppose each other.

The first and second movable elements may be composed of outer and inner rail members which are relatively movably fitted to each other and the first and second linear motors are arranged between the outer and inner rail members. The inner rail member includes a first inner rail and a second inner rail which are assembled to be relatively movable.

The first movable element may be a flat rectangular base and the second movable element may be a flat rectangular table, the base and table being assembled to be slidable to each other.

According to such preferred embodiment, the thrust force can be generated at the same position as the position of the guide unit irrespective of the position of the first movable element with respect to the second movable element. For this reason, even if the respective linear motors generate thrust components in directions other than the relatively movable direction of the movable elements, the guide unit positioned on the thrusting point can surely load the thrust components in the directions other than the relatively movable direction. Accordingly, the first movable element can be smoothly moved with respect to the second movable element. Further, in a case where the thrust is not generated at the same position as that of the guide unit, moments will be caused to the respective movable elements by the thrust components in the directions other than in the relatively movable direction, and such moments disturb the smooth movement of the first movable element with respect to the second movable element. Such defect can be eliminated by the above structure of the present invention.

Furthermore, a relatively wide distance can be ensured between two guide units in an optional attitude of the first movable element with respect to the second movable element, so that the driving apparatus of this embodiment can also load the moment load.

Still furthermore, the first and second linear motors may generate the thrust forces at the same positions of the first and second guide units, respectively.

The nature and further characteristic features may be made more clear from the following descriptions made with reference to the accompanying drawings.

BRIEF DESCRIPTION OF THE DRAWINGS

In the accompanying drawings:

FIG. 12 represents a driving apparatus according to a second embodiment of the present invention and includes FIGS. 12A and 12B, in which

DESCRIPTION OF THE PREFERRED EMBODIMENTS

Preferred embodiments of the present invention will be described hereunder with reference to the accompanying drawings.

Figure 1:
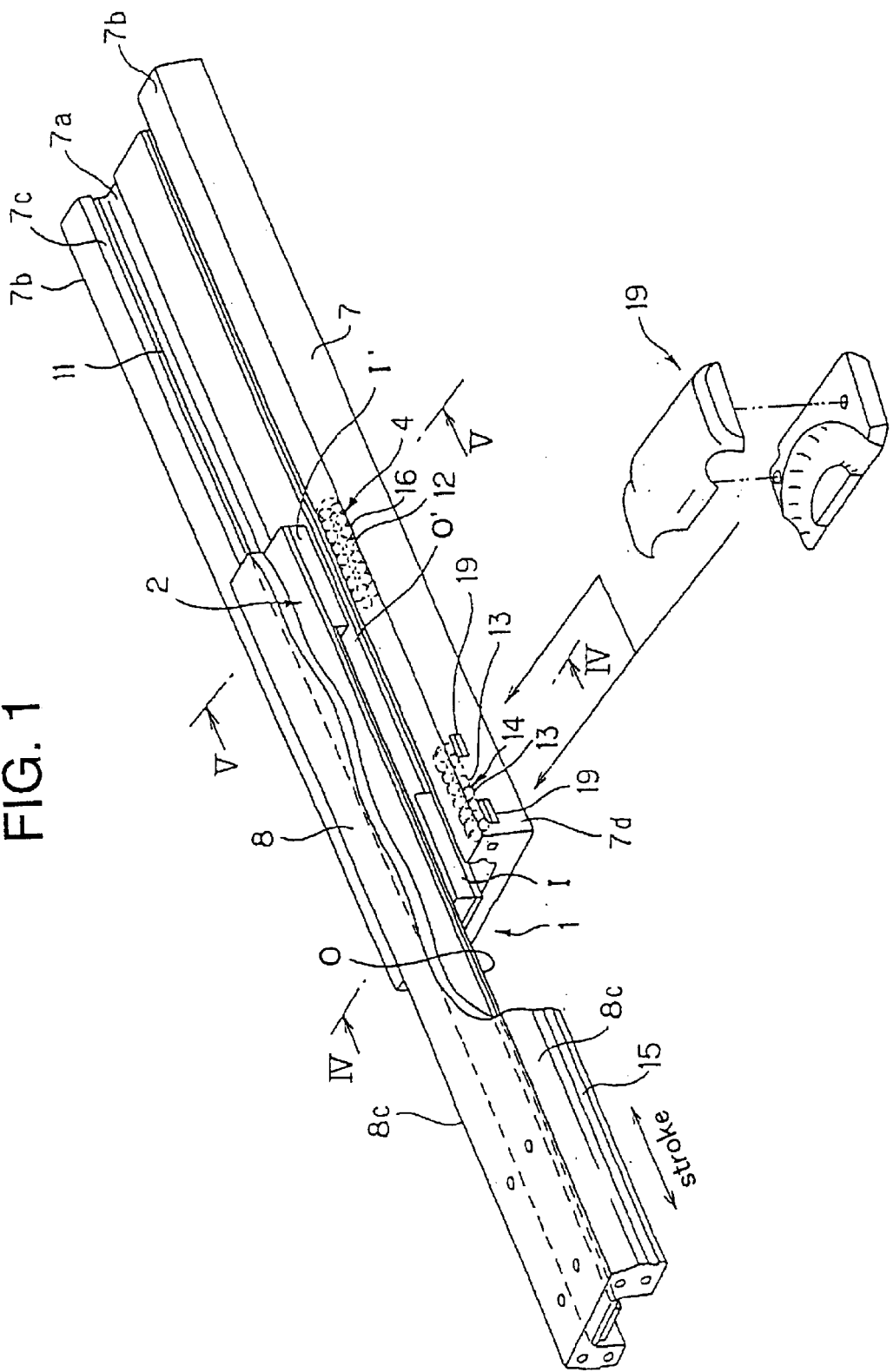
FIG. 1 is a perspective view of a driving apparatus including a linear motor system according to a first embodiment of the present invention.
Figure 2:
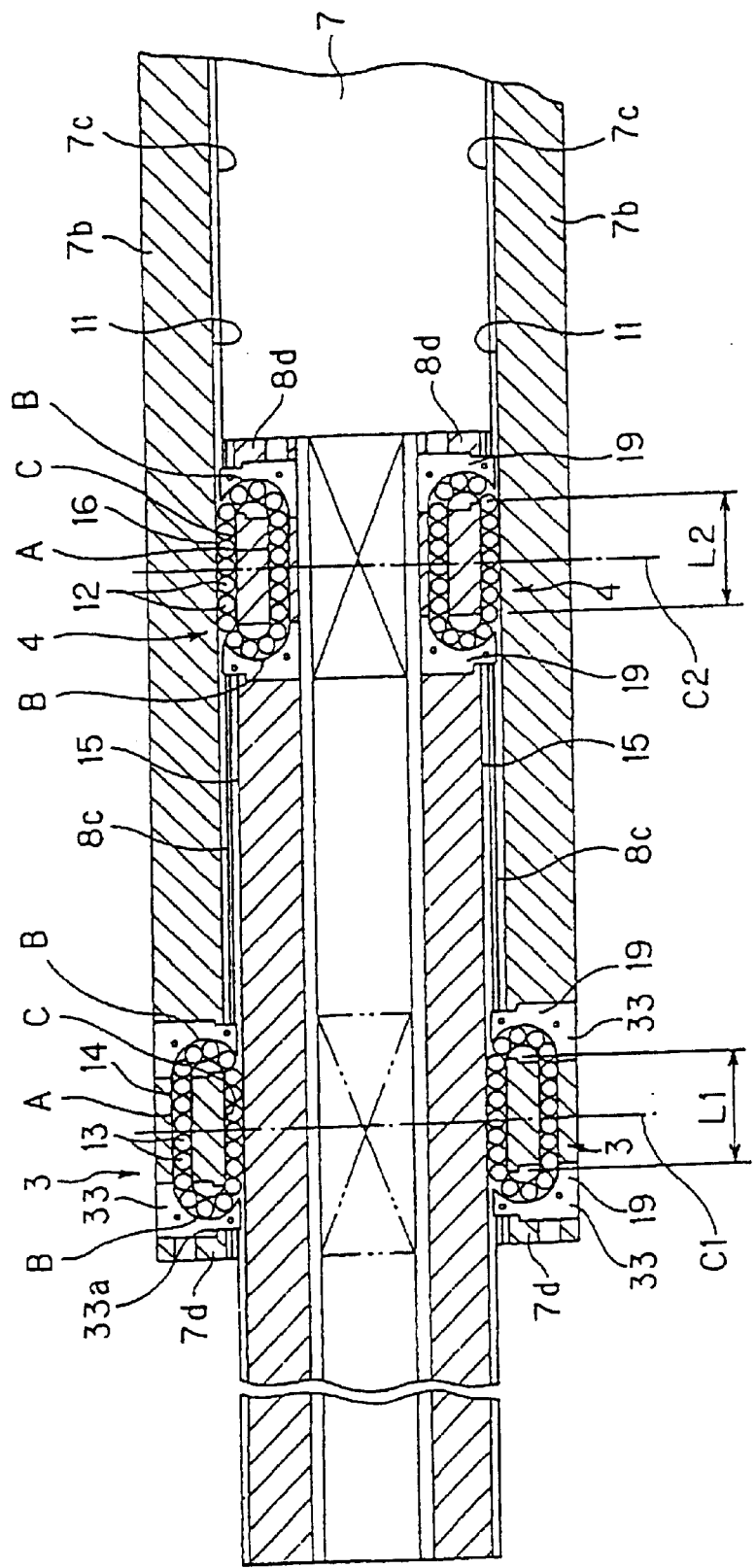
FIG. 2 is a transverse sectional view of the apparatus of FIG. 1.
Figure 3:
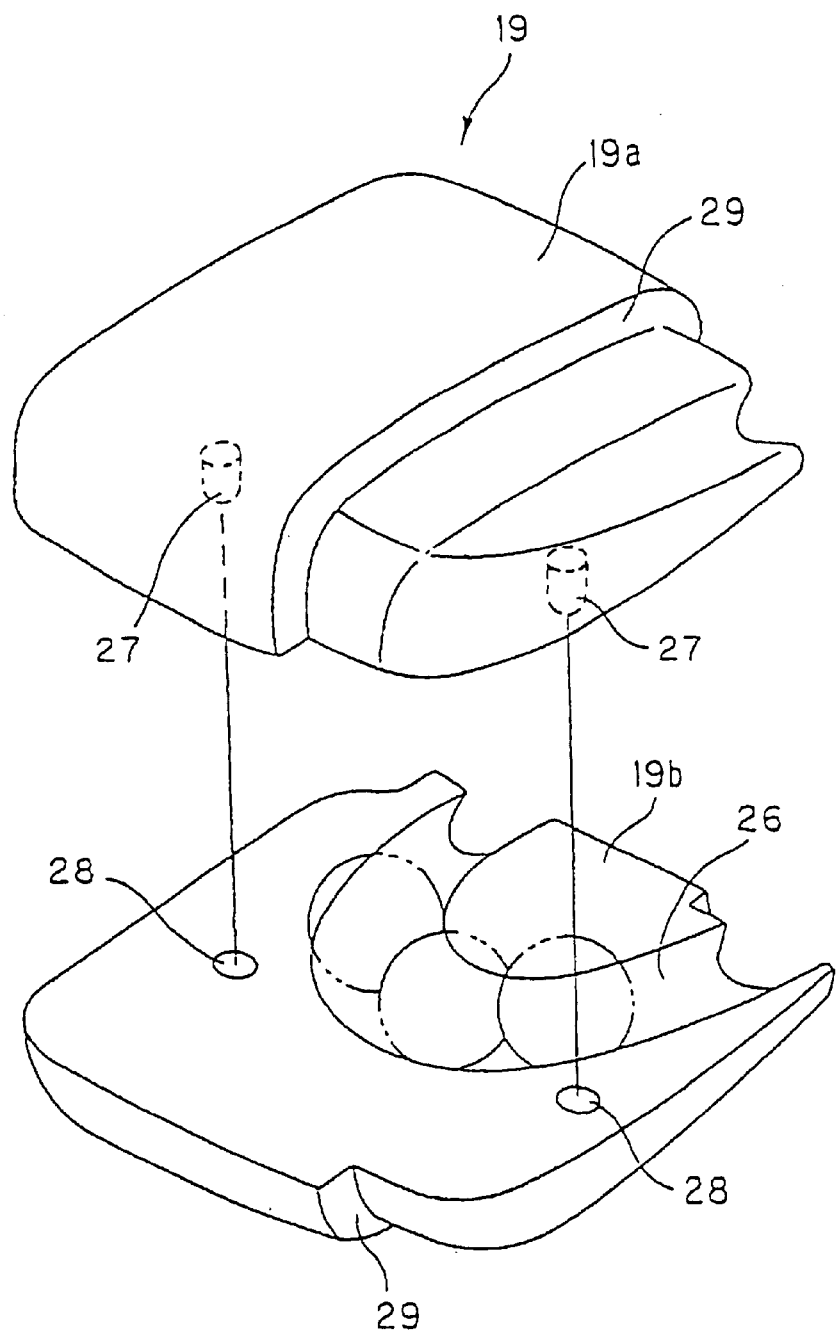
FIG. 3 shows an illustration of a developed deflector to be assembled to the driving apparatus shown in FIG. 1.

With first reference to FIGS. 1 to 3, a driving apparatus according to the first embodiment of the present invention is described hereunder.

A driving apparatus of this first embodiment comprises an outer rail 7 as a first member relatively movable (called, hereinlater, first movable member), an inner rail 8 as a second member relatively movable (called, hereinlater, second movable member), which is supported to be slidable in a relatively movable direction, i.e., longitudinal direction of the outer rail 7 and first and second linear motors 1 and 2, as driving means, disposed between the outer rail 7 and the inner rail 8. That is, the inner rail 8 is relatively movable with respect to the outer rail 7.

The first linear motor 1 and the second linear motor 2 are composed, in this embodiment, of linear induction motors each having a combined structure of movable elements I, I' and stators O, O', which, for example, is operated by passing multi-phase alternating current (A.C.) to primary windings.

One of the primary movable elements I of the first linear motor 1 is mounted to one longitudinal end, i.e. a front (left side, as viewed) end, and on an upper surface of the outer rail 7, one of the stators O' of the second linear motor 2 existing on the longitudinal extension of the movable element I so as to be continuous thereto.

On the other hand, the movable element I' of the second linear motor 2 is mounted to one longitudinal (rear side) end of the lower surface of the inner rail 8, and a stator O of the first linear motor 1 existing on the longitudinal extension of the movable element I' so as to be continuous thereto. Attraction forces are generated between the movable element I and the stator O and between the movable element I' and the stator O', respectively, through the excitation of the linear motors 1 and 2. Further, in the described arrangement, the second linear motor 2 is assembled with the first linear motor 1 in a reversed state.

With reference to the illustration of FIG. 1, the outer rail 7 has a sectional shape as a box U-shape having an upper opening, called the recessed portion 7a, hereinlater. The recessed portion 7a is defined, at both longitudinal sides, by projected ridges (side wall sections) 7b, 7b, extending in parallel to each other in the longitudinal direction. The ridges 7b, 7b each have an inner wall surface to which one ball rolling groove 11 is formed, along the longitudinal direction thereof, as a rolling member rolling surface.

Furthermore, with reference to FIG. 2, the outer rail 7 is provided, at its one (front) end, with an outer rail side guide unit 3 as first guide means for guiding the longitudinal movement of the inner rail 8 with respect to the outer rail 7. This outer rail side guide unit 3 is composed of a number of balls 13, 13,—as rolling members rolling between the inner rail 8 and the outer rail 7 and an outer rail side ball circulation passage 14 along which the balls 13 circulate. The structure of this outer rail side ball circulation passage 14 will be described hereinlater.

At the time of assembling, the inner rail 8 is inserted into the recessed portion 7a of the outer rail 7 so as to be supported between the ridges 7b, 7b of the outer rail 7 through the guidance of the outer rail side guide unit 3 and inner rail side guide unit 4. The inner rail 8 has a sectional shape as a box U-shape having a lower opening, called recessed portion 8a, hereinlater. The inner rail 8 has outer side surfaces 8c, 8c opposing to inside surfaces 7c, 7c, and loaded ball rolling grooves 15, 15 are formed to the outer side surfaces 8c, 8c so as to correspond to the ball rolling grooves 11, 11 of the ridges 7b, 7b of the outer rail 7.

On the other side end (rear side end) opposing to the outer rail side ball circulation passage 14, there is formed the inner rail side guide unit 4 as second guide means for guiding the longitudinal movement of the inner rail 8 with respect to the outer rail 7.

The inner rail side guide unit 4 and the outer rail side guide unit 3 are arranged along the longitudinal direction of the inner rail 8 or outer rail 7. The inner rail side guide unit 4 is formed with a number of balls 12, 12—rolling between the inner rail 8 and the outer rail 7 and an inner rail side ball circulation passage 16 along which the balls 12 circulate. Further, the outer rail side guide unit 3 is formed to one end portion of the outer rail 7, and on the other hand, the inner rail side guide unit 4 is formed to one end of the inner rail 8. Accordingly, these outer and inner rails 7 and 8 are assembled from directions along which both do not interfere with each other.

With reference to FIG. 2, the outer rail side ball circulation passage 14 is composed of a loaded rolling groove C opposing to the ball rolling groove 11, a ball return passage A as rolling member return passage, which is arranged to be substantially parallel to the ball rolling groove 11, and a pair of rolling member rolling direction changing passages B communicating the loaded rolling groove C and the ball return passage A. In such arrangement, a number of balls 13, 13,—are disposed between the ball rolling groove 11 and the loaded rolling groove C.

The inner rail 8 is supported by the outer rail 7 through these balls 13, and the inner rail 8 is slid in the longitudinal direction of the outer rail 7 through the circulation of the balls 13, 13,—along the outer rail side ball circulation passage 14. Then, the outer rail side guide unit 3 supports the inner rail 8 at a portion having a length L1 in the longitudinal direction of the loaded rolling groove C with the supporting center being positioned on the center line C1 in the longitudinal direction of the loaded rolling groove C.

As like the outer rail side ball circulation passage 14, the inner rail side ball circulation passage 16 is also composed of a loaded rolling groove C opposing to the ball rolling groove 15, a ball return passage A as rolling member return passage, which is arranged to be substantially parallel to the ball rolling groove 15, and a pair of rolling member rolling direction changing passages B communicating the loaded rolling groove C and the ball return passage A. In such arrangement, a number of balls 12, 12,—are disposed between the loaded ball rolling groove 15 and the loaded rolling groove C.

The inner rail 8 is supported by the outer rail 7 through these balls 12, and the inner rail 8 is slid in the longitudinal direction of the outer rail 7 through the circulation of the balls 12, 12,—along the inner rail side ball circulation passage 16. Then, the inner rail side guide unit 4 supports the inner rail 8 at a portion having a length L1 in the longitudinal direction of the loaded rolling groove C with the supporting center being positioned on the center line C2 in the longitudinal direction of the loaded rolling groove C.

The ball return passages A are formed respectively through drilling working effected in the longitudinal direction from the ends of outer rail body 7d and inner rail body 8d. The respective direction changing passages B of the outer rail side ball circulation passage 14 and the inner rail side ball circulation passage 16 are formed in deflectors 19, which are to be mounted to the inner rail body 8d and the outer rail body 7d as members independent therefrom.

The deflector 19 is shown in FIG. 3.

The deflector 19 is commonly utilized for the inner rail side ball circulation passage 16 and the outer rail side ball circulation passage 14. The deflector 19 is formed with a direction changing passage 26 having a semi-circular shape. The deflector 19 is composed of two halves 19a, 19a divided along the direction changing passage 26 so that the direction changing passage 26 can be easily formed. These halves 19a, 19a are divided as vertical sections by a plane including a center line of the direction changing passage 26, the divided halves 19a, 19a being positioned through engagement of a dimple 27 and a slit 28 formed to the halves 19a, 19a. The deflector 19 is also formed with a staged abutment portion 29 so as to position the inner rail side ball circulation passage 16 and the outer rail side ball circulation passage 14 at the mounting working thereof. Such deflector 19 may be, for example, formed from a synthetic resin through an injection molding process.

As shown in FIG. 2, the outer rail body 7d is drilled from the side portions by means of an end mill, for example, to thereby form holes 33, through which the deflector 19, such as shown in FIG. 3, is inserted and mounted to the outer rail 7. The inserted deflector 19 is firmly fixed to the outer rail body 7d by using fixing means such as bonding material. The hole 33 is formed so as to penetrate the ball return passage A and extend to the ball rolling groove 11 or loaded ball rolling groove 15. The hole 33 is also formed therein with a staged portion 33a abutting against the abutment portion 29 of the deflector 19. The outer periphery of the deflector 19 is fitted to the holes 33 until the abutment portions 29 abut against the staged portions 33a in the holes 33, thus positioning the deflector 19 with respect to the outer rail body 7d or inner rail body 8d. The positioning of the deflector 19 makes it possible to surely scoop the balls 12 or 13 from the ball rolling groove 11 or loaded ball rolling groove 15 and surely return the balls 12 or 13 to the ball return passage A.

Furthermore, the inner rail body 8d is also drilled from the side portions thereof by means of an end mill, for example, so as to form holes 33 into which the deflector 19 is fitted and mounted to the inner rail body 8d. Further, it is to be noted that, in the described embodiment, although the outer rail body 7d is drilled from its outer side portions and the inner rail body 8d is drilled from its inner side portions to form the holes 33, it is of course possible to form the holes 33 from the inner side portions of the outer rail body 7d and the outer side portions of the inner rail body 8d.

Figure 4:
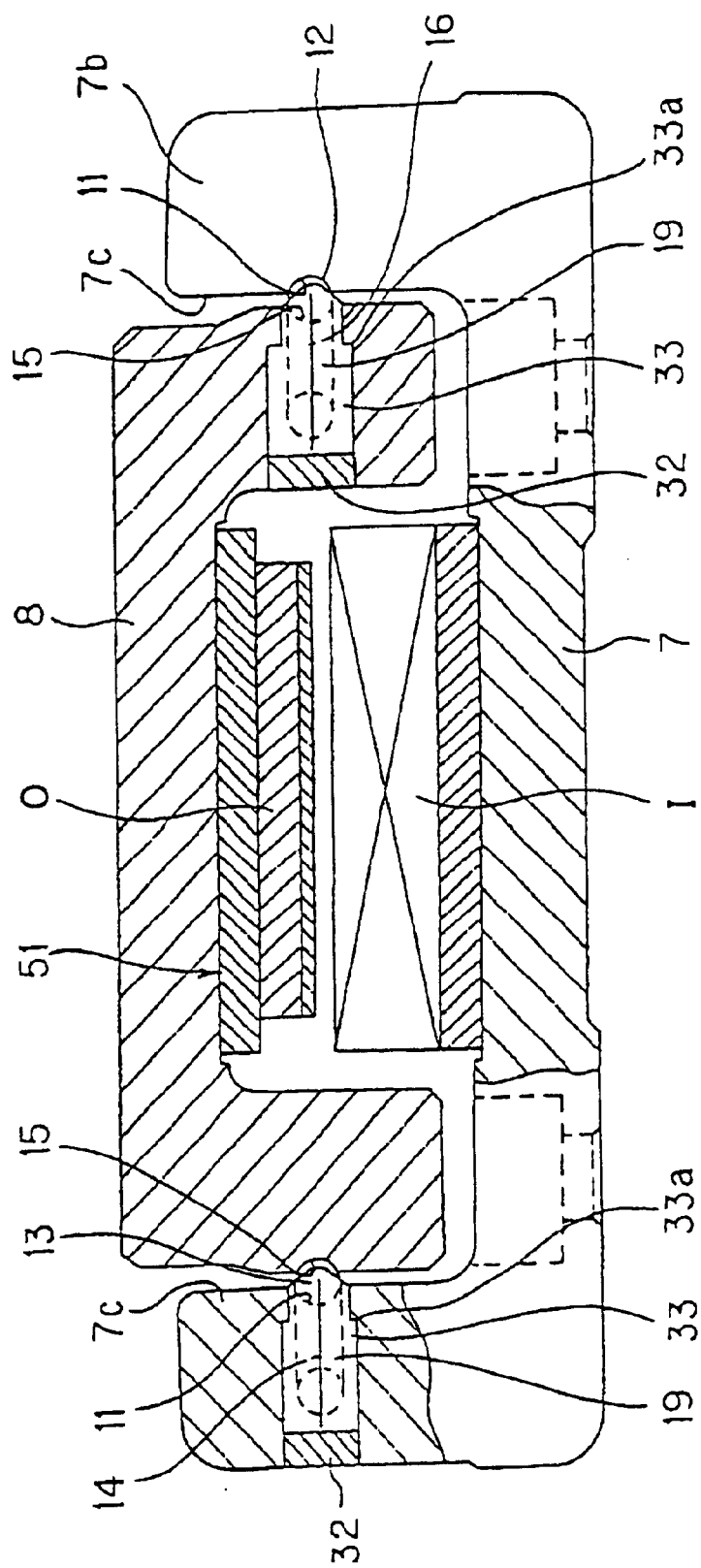
FIG. 4 is a sectional view taken along the line IV—IV in FIG. 1.
Figure 5:
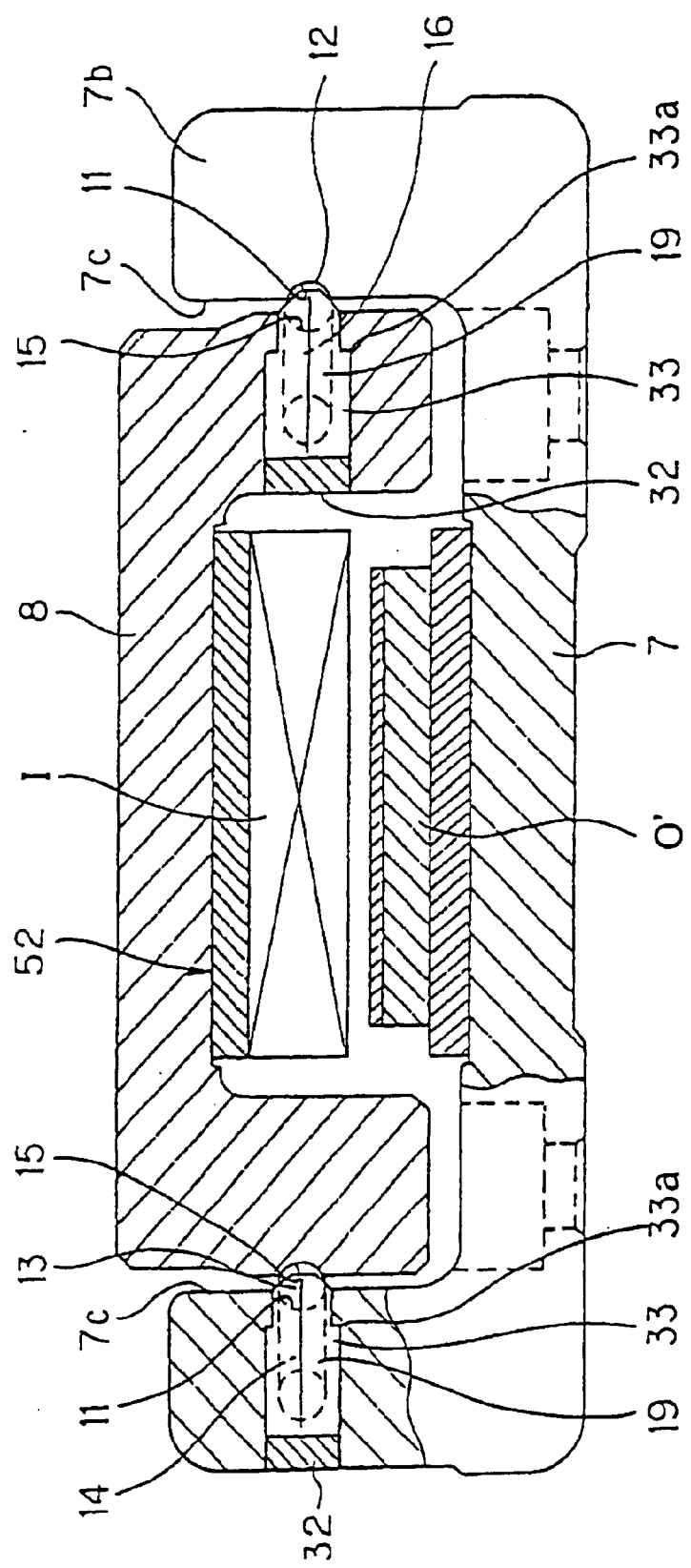
FIG. 5 is also a sectional view taken along the line V—V in FIG. 1.
Figure 6:
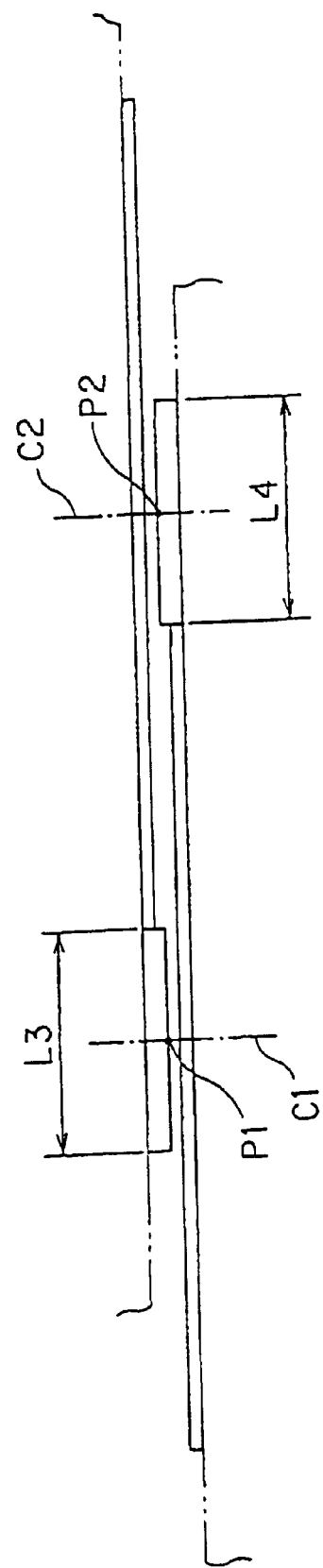
FIG. 6 is a side view illustrating a combination of two linear motors.

Next, with reference to FIG. 4, the movable element I of the first liner motor 1 is arranged so as to oppose to the stator O of the first linear motor 1, and as also shown in FIG. 5, the movable element I' of the second liner motor 2 is arranged so as to oppose to the stator O'of the second linear motor 2. As shown in FIG. 6, the second linear motor 2 is assembled to the first linear motor 1 in the state reversed thereto.

Figure 7:
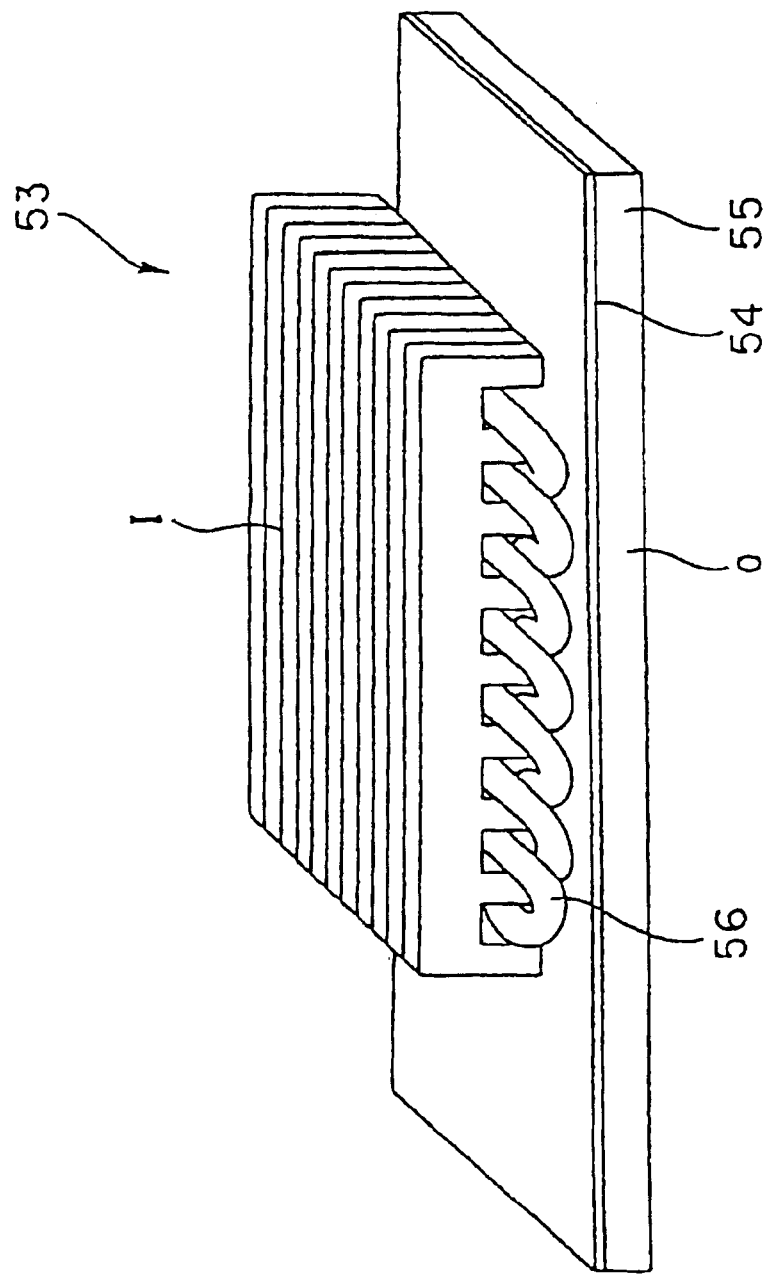
FIG. 7 is a perspective view showing a linear induction motor.

FIG. 7 shows a linear induction motor 53 which is one example of the first or second linear motor 1 or 2. The linear induction motor comprises a movable element I and a stator O. The stator O is composed of a non-magnetic conductor plate 54 and a magnetic conductor plate 55, which are laminated vertically as viewed. Such linear induction motor 53 basically operates like a squirrel cage induction motor (rotor type), and the operation thereof will be explained by utilizing the Lenz's law and Fleming's left-hand rule. When a polyphase current (A.C.) passes through a polyphase primary winding 56, a progressive magnetic field moving in time and in space is generated. This progressive field induces an eddy current on the non-magnetic conductor plate 54 being a secondary side, and this eddy current constitutes a thrust (force) generation source together with the progressive field.

With reference to FIG. 6, for the movable elements I and I', substantially even thrust force acts along entire portions having longitudinal lengths L3 and L4, and accordingly, a thrusting point P1 of the movable element I lies substantially on the center line C1 of the portion having length L3 and, on the other hand, a thrusting point P2 of the movable element I' lies substantially on the center line C2 of the portion having length L4. The thrusting point P1 is positioned approximately on the center line C1 of the support of the outer rail side guide unit 3 (see FIG. 2) and the thrusting point P2 is positioned approximately on the center line C2 of the support of the inner rail side guide unit 3.

Figure 8:
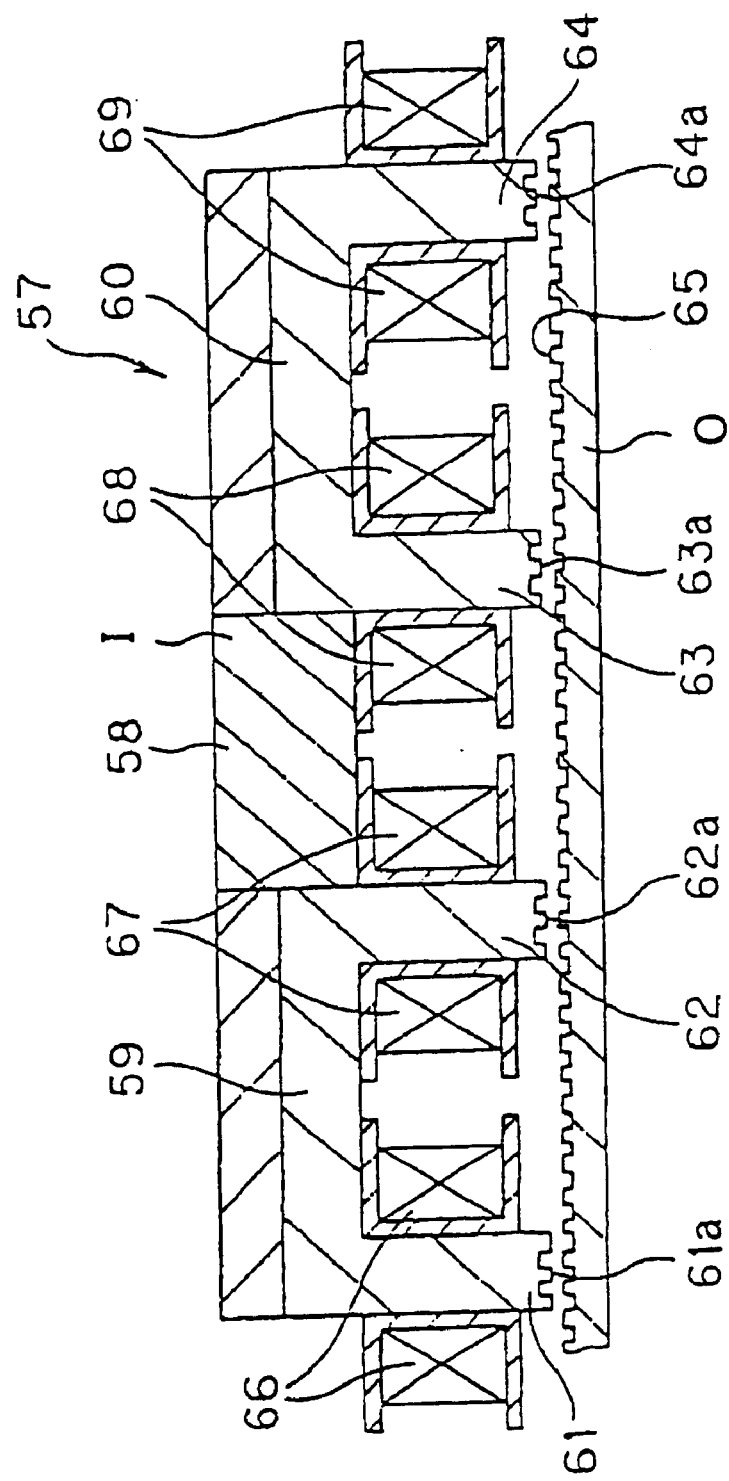
FIG. 8 is an elevational section of a linear pulse motor taken along a longitudinal direction thereof.

FIG. 8 shows a linear pulse motor 57 as one example of the first or second linear motor 1 or 2. In this example, the movable element I has a structure in which two magnetic cores 59 and 60 are arranged laterally in an opposed manner with a permanent magnet 58 being disposed at a central portion therebetween. In one magnetic core 59, first and second magnetic poles 61 and 62 magnetized as N-poles by the permanent magnet 58 are formed, and on the other hand, in the other magnetic core 60, third and fourth magnetic poles 63 and 64 magnetized as S-poles by the permanent magnet 58 are also formed.

The stator O is formed with stationary teeth (stator teeth) 65 which extend in a direction perpendicular to the longitudinal direction of the stator O. The stationary teeth 65 have a substantially box U-shape section in each tooth and being arranged with equal pitch along the entire length direction thereof. Like this stator O, the respective magnetic poles 61 to 64 are formed with magnetic pole teeth 61a to 64a with the same pitch as that of the stator O, respectively.

First and second coils 66 and 67 are wound around the first and second magnetic poles 61 and 62 of the N-pole side and these coils 66 and 67 are respectively connected in series so as to generate reverse directional magnetic fluxes when current flows. The first and second coils 66 and 67 are electrically connected to a pulse generator, not shown. On the other hand, third and fourth coils 68 and 69 are wound around the third and fourth magnetic poles 63 and 64 of the S-pole side. These coils are also respectively connected in series and connected electrically to a pulse generator, not shown.

In the illustrated example of FIG. 8, for example, it is supposed that, for the second magnetic pole 62 with respect to the first magnetic pole 61, phases of the magnetic pole teeth 61a and the magnetic pole teeth 62a are shifted from each other each by ½ pitch, and likely, for the fourth magnetic pole 64 with respect to the third magnetic pole 63, phases of the magnetic pole teeth 63a and the magnetic pole teeth 64a are shifted from each other each by ½ pitch. Furthermore, it is also supposed that, for the magnetic pole teeth 63a and 64a of the third and fourth magnetic poles 63 and 64 on the S-pole side are shifted in phases by ¼ pitch with respect to the magnetic pole teeth 61a and 62a of the first and second magnetic poles 61 and 62 on the N-pole side.

Hereunder, operational theory of the linear pulse motor will be described with reference to FIGS. 9A to 9D.

In the illustrated example, pulses are inputted into the first coil 66 and the second coil 67 through a terminal "a" and into the third coil 68 and the fourth coil 69 through a terminal "b".

Figure 9A:
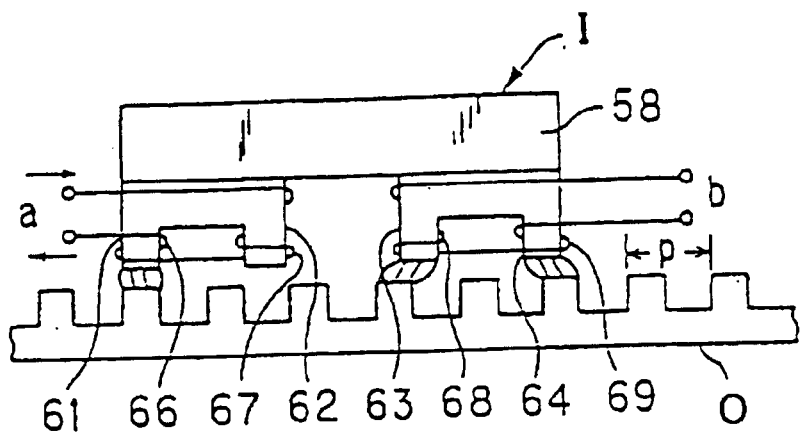
FIGS. 9A to 9D are illustrated sectional views showing a theory of operation of the linear pulse motor.
Figure 9B:
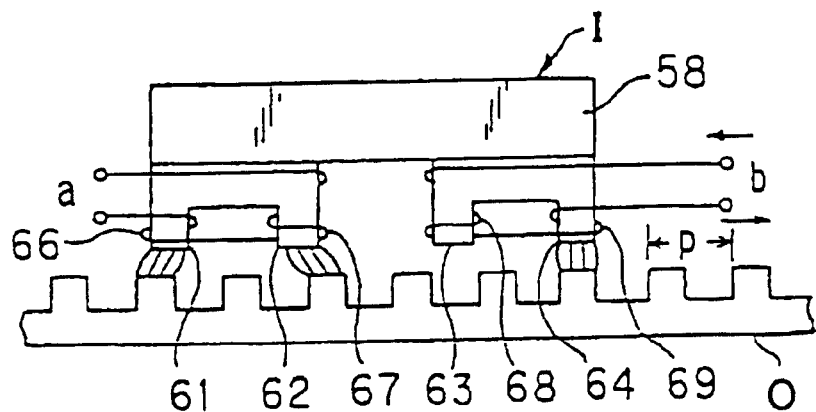
Figure 9C:
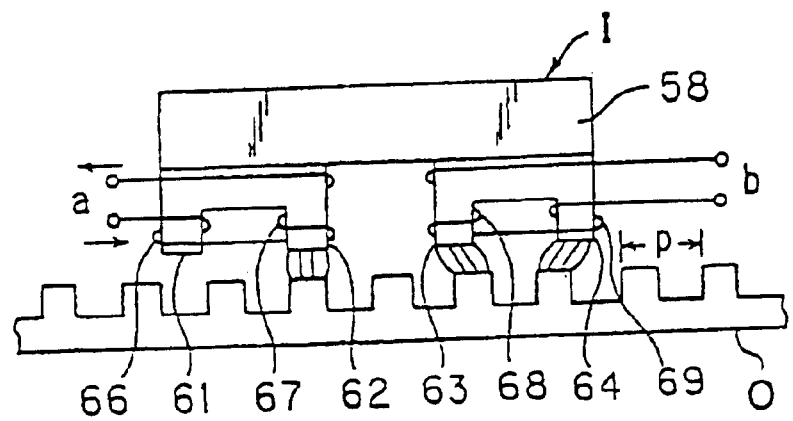
Figure 9D:
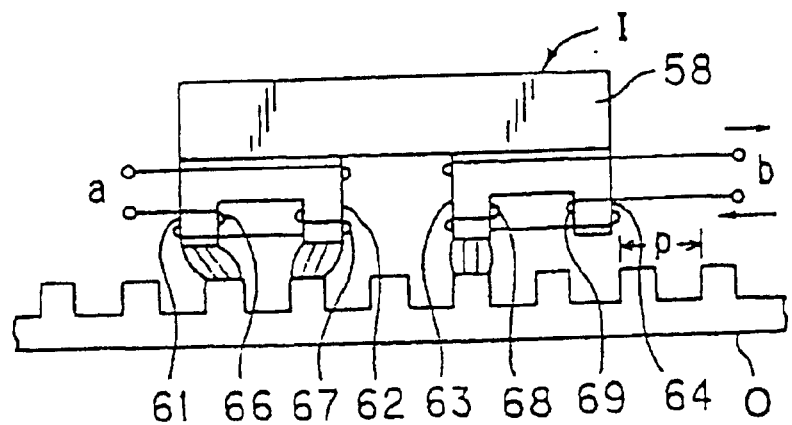

In the state of FIG. 9A, the pulse is inputted to the terminal "a" in a direction to energize (excite) the first magnetic pole 61, in the state of FIG. 9B, the pulse is inputted to the terminal "b" in a direction to energize (excite) the fourth magnetic pole 64, in the state of FIG. 9C, the pulse is inputted to the terminal "a" in a direction to energize the second magnetic pole 62, and in the state of FIG. 9D, the pulse is inputted to the terminal "b" in a direction to energize the third magnetic pole 63.

With reference to FIG. 9A, when the pulse is inputted into the terminal "a" in the direction to energize the first magnetic pole 61, the first magnetic pole 61 maintains a stable state with the addition of the magnetic flux of the first coil 66 to the magnetic flux of the permanent magnet 58. Next, with reference to FIG. 9B, when the pulse is inputted into the terminal "b" in the direction to energize the fourth magnetic pole 64, the fourth magnetic pole 64 moves in a direction to maintain a stable state, i.e., right direction as viewed on the drawing, by ¼ pitch. As mentioned above, the movable element performs continuous motion as shown in FIGS. 9C and 9D by alternately flowing pulse current.

Figure 10:
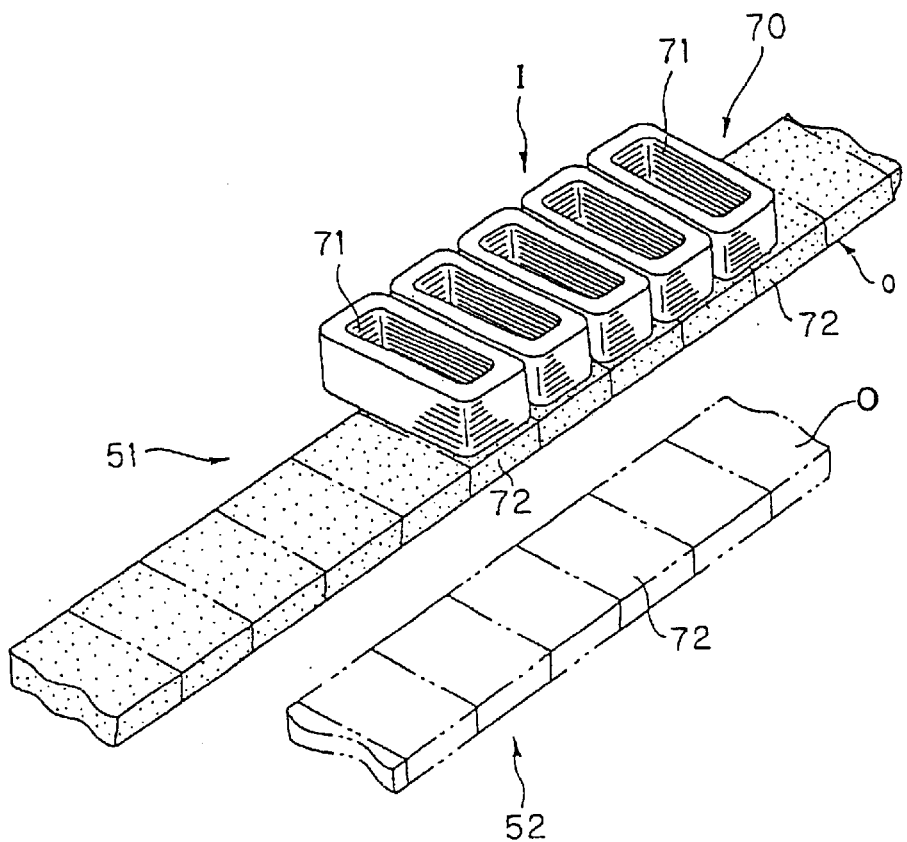
FIG. 10 shows a perspective view of a linear direct current (D.C.) motor.

FIG. 10 shows a linear D.C. motor 70 as a further example of a linear motor.

In this example, a movable element I is composed of an excitation coil 71 and a yoke, and a stator O is composed of a magnet 72 and a yoke. The excitation coil 71 of the movable element I comprises a plurality of excitation coil elements 71 which are arranged side by side. On the other hand, the magnet of the stator O comprises a plurality of magnet elements 72 are also arranged side by side so that the N-pole and S-pole are exhibited alternately.

The position of the movable element I is detected by a sensor, and the sensor is sequentially switched so as to reversely flow the current of the excitation coil elements 71 at the detected position of the movable element I. The excitation coil elements 71 generate the thrust force according to the Fleming's left-hand rule.

In the case of using such linear D.C. motor, when two sets of linear motors 51 and 52 are arranged back to back and a distance between the secondary side magnet elements 72, 72 is short, there may cause such a fear that an alternate field may be generated therebetween and operation defect may be hence caused. Accordingly, in the case where two sets of linear motors 51 and 52 are arranged back to back, it becomes possible to effectively use the linear induction motor 53 or linear pulse motor 57 using no secondary side magnet (magnet elements) 72. Furthermore, in a case where it is possible to make the distance on the secondary side large in some extent, no mutual interference is caused and, hence, the linear D.C. motor 70 may be also usable.

A driving apparatus incorporated with the linear motors 1 and 2 of the structures mentioned above operates in the following manner.

Referring to FIG. 1, when the current passes through the movable elements I and I' of the first and second linear motors 51 and 52, the suction forces are caused between the movable elements I and I' and the stators O and O', and the inner rail 8 is moved along its longitudinal direction with respect to the outer rail 7 by a predetermined distance. In such occasion, the movable element I of the first linear motor 1 advances with respect to the stator O. However, with respect to the second linear motor 2, it may be said that the stator O'is moved, and accordingly, a current is applied to the movable element I' to move backward the movable element I'with respect to the stator O', which then advances as reaction thereto. The inner rail 8 is hence slid with respect to the outer rail 7, and an entire length (i.e., distance between the front end of the inner rail 8 and the rear end of the outer rail 7) of the driving apparatus is expanded or contracted.

The location of the linear motors 1 and 2 between the inner rail 8 and the outer rail 7 makes it possible to increase the thrust force in two times, and moreover, the excitations of the respective linear motors 1 and 2 are made averaged and the movement of the inner rail 8 is made smooth. Furthermore, since the second linear motor 2 is assembled in a manner reverse to the first linear motor 1, the thickness of the entire structure of the linear motor system can be made thin substantially equal to the thickness of the first or second linear motor 1 or 2 which is located alone.

Still furthermore, the first and second linear motors 1 and 2 can generate the thrust force, regardless of the position of the inner rail 8 with respect to the outer rail 7, at the same positions as those of the inner and outer rail side guide units 3 and 4 in the longitudinal direction thereof. For this reason, even in a case where the respective linear motors 1 and 2 generate thrust component in a direction (for example, perpendicular direction) other than that in the longitudinal direction (for example, horizontal direction), the inner and outer rail side guide units 3 and 4 positioned on the thrusting points P1 and P2 surely bear the thrust component other than that in the longitudinal direction. Therefore, the inner rail 8 can be smoothly moved with respect to the outer rail 7.

Figure 11:
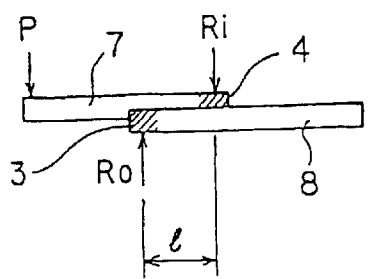
FIG. 11 is an illustration showing a state that a load is applied to a front end portion of the driving apparatus.

FIG. 11 shows a state that a load P is applied to the front end portion of the inner rail 8 of the driving apparatus mentioned above. In an optional expansion attitude, there is a considerable distance "1" between the outer rail side guide unit 3 and the inner rail side guide unit 4, so that the driving apparatus capable of bearing moment load will be provided. For example, when the load P is applied to the front end portion of the inner rail of such driving apparatus, a repulsive force Ro is applied to the outer rail side guide unit 3, a repulsive force Ri is applied to the inner tail side guide unit 4, and accordingly, the moment load of (Ri×"1") can be loaded. When the inner rail 8 is slid and the stroke of the inner rail 8 is increased, the distance "1" is gradually reduced and ability of bearing such moment load is also decreased. However, even if the inner rail 8 is slid, the balls 12, 12,—and 13, 13,—circulate without being come off from the inner and outer rails 8 and 7, so that the ability of bearing the moment load cannot be extremely decreased. Furthermore, since the numbers of the balls 12 and 13 which can be loaded at an optional expansion attitude do not vary, and accordingly, a driving apparatus capable of bearing a constant radial load or thrust load can be provided.

As mentioned above, the outer rail 7 is formed so as to have a box-shaped section having the recessed portion 7a having an opening, the ball rolling grooves 11 are formed to the inner side surfaces 7c of the outer rail 7, the inner rail 8 is fitted to the recessed portion 7a of the outer rail 7, and the loaded ball rolling grooves 15 are also formed to the outer side surfaces 8c of the inner rail 8 so as to oppose to the inner side surfaces 7c of the outer rail 7. Accordingly, there can be provided a rolling guide apparatus capable of bearing, in a balanced state, radial load, thrust load and moment load.

FIG. 12 shows a driving apparatus representing a second embodiment of the present invention.

Figure 12A:
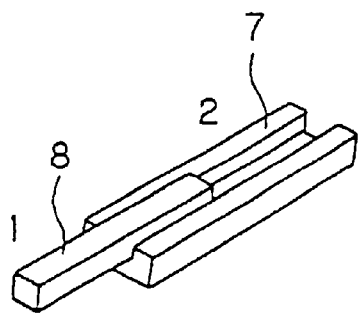
FIG. 12A is a perspective view showing a two-stage type driving apparatus of the first embodiment and FIG. 12B is also a perspective view showing a three-stage type driving apparatus of the second embodiment.
Figure 12B:
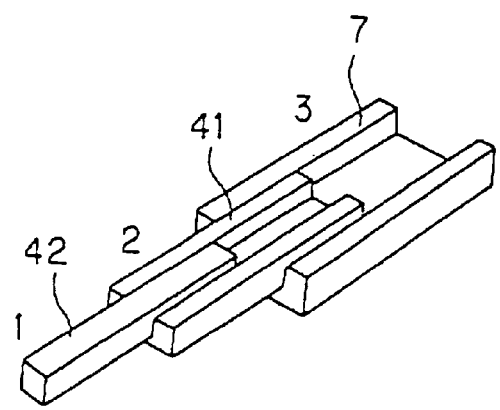

FIG. 12A shows a single-stroke structure having an outer rail 7 and an inner rail 8 only which slides, and on the contrary, FIG. 12B shows a structure having first and second inner rails 41 and 42 and an outer rail 7, in which the first inner rail 41 is fitted into the outer rail 7 and the second inner rail 42 is fitted to the first inner rail 41. In this structure, the first inner rail 41 is slid with respect to the outer rail 7 and the second inner rail 42 is slid with respect to the first inner rail 41. That is, the first inner rail 41 has a structure similar to that of the inner rail 8 of the example of FIG. 12A with respect to the outer rail 7 and similar to that of the outer rail 7 with respect to the second inner rail 42, and the second inner rail 42 has a structure similar to that of the inner rail 8 of the example of FIG. 12A. First and second linear motors 1 and 2 of the structures mentioned hereinbefore are arranged between the outer rail 7 and the first inner rail 41, and third and fourth linear motors are also arranged between the first and second inner rails 41 and 42, in which the third linear motor is assembled with the fourth linear motor in a state reversed in its attitude. According to the driving apparatus of such structure, the second inner rail 42 is moved with so-called double-stroke, so that the expansion stroke can be effectively increased. Therefore, by assembling a plurality of such structures having a plurality of expansion strokes, a driving apparatus having more large stroke will be realized.

Figure 13:
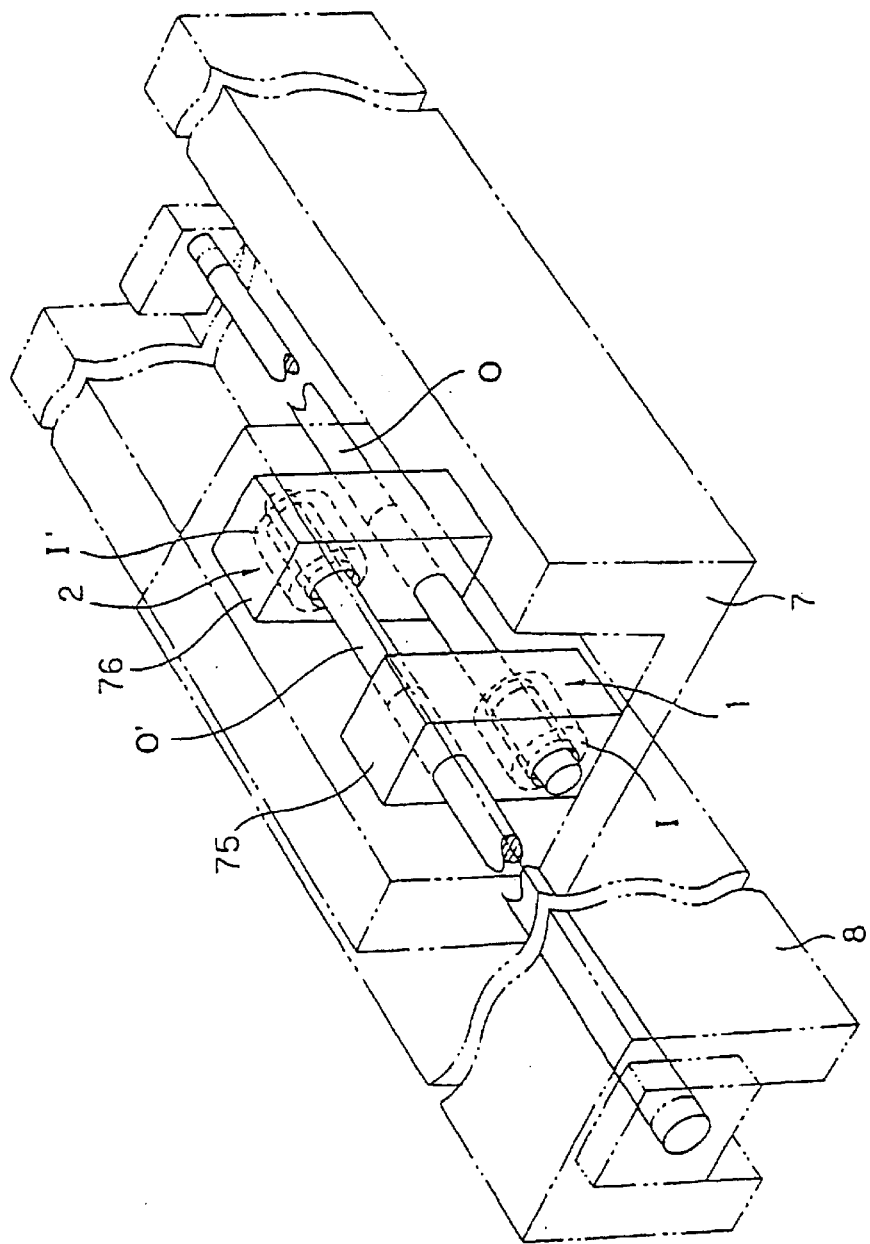
FIG. 13 is a perspective view of a driving apparatus including a linear motor system according to a third embodiment of the present invention.

FIG. 13 shows a third embodiment of a driving apparatus of the present invention.

The driving apparatus of this embodiment is provided with two rod-type linear motors as first and second linear motors 1 and 2 mentioned above. As like the former embodiment, this driving apparatus also includes an outer rail 7, an inner rail 8 mounted to the outer rail 7 to be slidable in the longitudinal direction thereof and first and second linear motors 1 and 2 disposed between these outer and inner rails 8 and 7. The outer rail 7 and inner rail 8 are formed so as to provide box- (]-) shaped section so that the inner rail 8 is fitted into the outer rail 7.

The first and second rod-type linear motors are respectively composed of rods O, O' as stators and cylindrical coils I, I' as movable elements surrounding the stators O, O'. The cylindrical coils I and I' comprise a plurality of electromagnets laminated axially. The rods O and O', on the other hand, comprise a plurality of permanent magnets also laminated axially. The coils I and I' are fitted to the rods O and O', with predetermined gaps, respectively, to be relatively movable in the axial direction thereof. The rod O (O') may be composed of a single magnetic material to which N and S poles are alternately formed.

The cylindrical coil I of the first rod type linear motor 1 is mounted to the front end portion of the outer rail 7, and moreover, an outer rail side pedestal 75 supporting the rod O' of the second rod type linear motor 2 to be slidable in the axial direction is fixed to that front end portion. On the other hand, the cylindrical coil I of the second rod type linear motor 2 is mounted to the rear end portion of the inner rail 8, and moreover, an inner rail side pedestal 76 supporting the rod O of the first rod type linear motor 1 to be slidable in the axial direction is fixed to that rear end portion. The operation theory of this type driving apparatus is substantially the same as that of the above-mentioned embodiment, and by operating the first and second linear motors, a distance between the outer rail side pedestal 75 and inner rail side pedestal 76 is expanded (or contracted) to thereby slide the inner rail 8 with respect to the outer rail 7. Thus, the rod type linear motor can be used as a linear motor mentioned with respect to the first embodiment.

Figure 14:
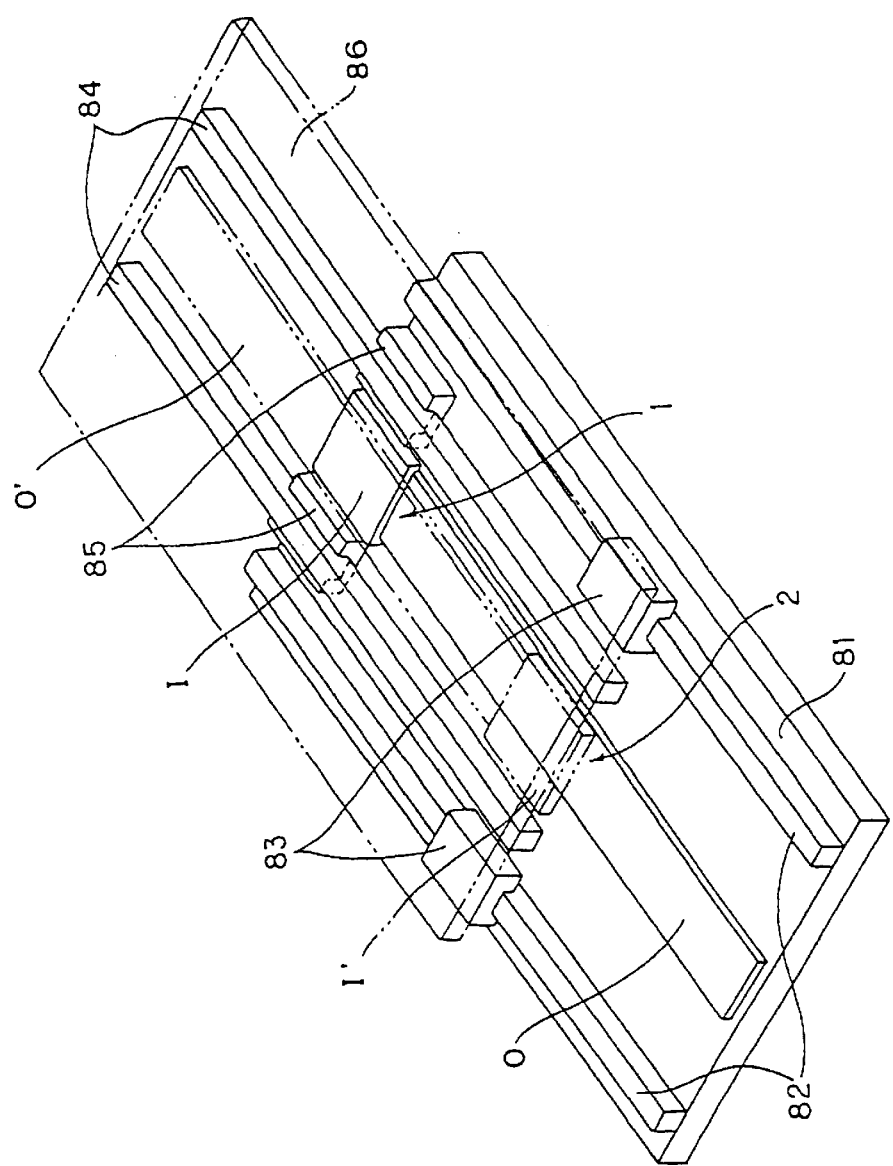
FIG. 14 is a perspective view of a driving apparatus including a linear motor system according to a fourth embodiment of the present invention.

FIG. 14 shows a driving apparatus according to the fourth embodiment of the present invention, and this driving apparatus is provided with a base 81 having a flat rectangular structure as a first relatively movable element and a table 86 also having a flat rectangular structure as a second relatively movable element.

A pair of base side rails 82, 82 for maintaining a balance are mounted to outside portions of an upper surface of the base 81, and movable side blocks 83, 83 are mounted to the base side rails 82, 82, respectively, to be slidable thereto. The movable side blocks 83, 83 are formed with ball circulation passages, not shown, respectively. Such base side rails 82, 82 and movable side blocks 83, 83 constitute a linear guide, which is per se known. The upper surfaces of the movable side blocks 83, 83 are fixed to one ends (rear ends) of the lower surface of the table 86.

Furthermore, table side rails 84, 84 for supporting a balance are mounted to the inside portions of the base side rails 82, 82 on the upper surface of the table 86 to be slidable with respect to stationary side (fixed) blocks 85, 85, respectively. The stationary side blocks 85, 85 are formed with ball circulation passages, not shown, and these table side rails 84, 84 and stationary side blocks 85, 85 constitute a linear guide which is per se known. The lower surfaces of the stationary side blocks 85, 85 are fixed to one (front) end of the base 81. In this illustrated embodiment, the inner rail side ball circulation passage 16 and the outer rail side ball circulation passage 14 are different from those of the first embodiment mentioned hereinbefore and formed, in this embodiment, to the blocks 83 and 85 formed as the members independent from the base 81 and the table 86.

The first and second linear motors 1 and 2 are arranged between the base 81 and the table 86. These first and second linear motors 1 and 2 in this embodiment have substantially the same structures as those of the linear motors 1 and 2 in the former embodiment, so that the explanations thereof are omitted herein by adding the same reference numerals.

The operation theory of the driving apparatus of this embodiment is substantially the same as that the first embodiment. In this fourth embodiment, when the current is inputted into the movable elements I and I' of the first and second linear motors 1 and 2, suction forces are generated between the movable elements I and I' and the stators O and O', and hence, the table 86 is moved by a predetermined amount in the longitudinal direction with respect to the base 81.

It is to be noted that the present invention is not limited to the described embodiments and many other changes and modifications may be made without departing from the scopes of the appended claims.

For example, in the described embodiments, although linear rail members are used as inner rail 8 and outer rail 7, curvilinear rails may be of course used therefor. Moreover, rollers may be used in place of balls 12 and 13. A flexible belt-shaped retainer for supporting the balls 12 and 13 in a slidable and rollable state may be provided, and a spacer or spacers may be also provided between the respective balls 12, 12,—and 13, 13,—for rotatably and slidably supporting the balls.

The present application claims priority under 35 U.S.C §119 to Japanese Patent Application No.2000-388444 filed Dec. 21, 2000 entitled "LINEAR MOTOR SYSTEM AND DRIVING APPARATUS DRIVEN BY SAME". The contents of that application are incorporated herein by reference in their entirety.

What is claimed is:

1. A linear motor system comprising:
    a first linear motor having a primary side, including a coil, being mounted to either one of first and second movable elements which are relatively movable with respect to each other; and
    a secondary linear motor having a secondary side mounted to said one of the first and second movable elements so as to extend in the relatively movable direction to be continuous to said primary side of the first linear motor,
    said second linear motor having a primary side, including a coil, mounted to another one of the first and second movable elements, and
    said first linear motor having a secondary side mounted to said another one of the first and second movable elements so as to extend in the relatively movable direction to be continuous to said primary side of the second linear motor.

2. A linear motor system according to claim 1, wherein said first and second linear motors are composed of linear induction motors, respectively, in which the secondary sides of the respective linear induction motors are arranged so as to oppose to each other.

3. A linear motor system according to claim 1, wherein said first and second linear motors are composed of linear pulse motors, respectively, in which the secondary sides of the respective linear pulse motors are arranged so as to oppose to each other.

4. A linear motor system according to claim 1, wherein said first and second movable elements are outer and inner rail members which are relatively movably fitted to each other and said first and second linear motors are arranged between the outer and inner rail members.

5. A driving apparatus comprising:
    first and second movable elements which are relatively movable with respect to each other; and
    a driving unit for giving driving power to said first and second movable elements,
    said driving unit being comprising a linear motor system, which comprises:

a first linear motor having a primary side, including a coil, being mounted to either one of the first and second movable elements which are relatively movable with respect to each other; and a secondary linear motor having a secondary side mounted to said one of the first and second movable elements so as to extend in the relatively movable direction to be continuous to said primary side of the first linear motor, said second linear motor having a primary side, including a coil, mounted to another one of the first and second movable elements, and said first linear motor having a secondary side mounted to said another one of the first and second movable elements so as to extend in the relatively movable direction to be continuous to said primary side of the second linear motor.

6. A driving apparatus according to claim 5, further comprising first and second guide units for guiding said second movable element in the relatively movable direction with respect to the first movable element, said first guide unit being provided for said first movable element and said second guide unit being provided for said second movable element, and wherein said first linear motor generates a thrust force at a position substantially the same position of the first guide unit in said relatively movable direction, and said second linear motor generates a thrust force at a position substantially the same position of the second guide unit in said relatively movable direction.

7. A driving apparatus according to claim 6, wherein said primary side of the first linear motor is operatively connected to said first movable element, said first guide unit is fixed to the first movable element at a portion in a vicinity of the primary side of the first linear motor in said relatively movable direction, and said primary side of the second linear motor is operatively connected to said second movable element, and said second guide unit is fixed to the second movable element at a portion in a vicinity of the primary side of the second linear motor in said relatively movable direction.

8. A driving apparatus according to claim 5, wherein said first and second linear motors are composed of linear induction motors, respectively, in which the secondary sides of the respective linear induction motors are arranged so as to oppose to each other.

9. A driving apparatus according to claim 5, wherein said first and second linear motors are composed of linear pulse motors, respectively, in which the secondary sides of the respective linear pulse motors are arranged so as to oppose to each other.

10. A driving apparatus according to claim 5, wherein said first and second movable elements are outer and inner rail members which are relatively movably fitted to each other and said first and second linear motors are arranged between the outer and inner rail members.

11. A driving apparatus according to claim 10, wherein said inner rail member includes a first inner rail and a second inner rail which are assembled to be relatively movable.

12. A driving apparatus according to claim 5, wherein said first movable element is a flat rectangular base and said second movable element is a flat rectangular table, said base and table being assembled to be slidable to each other.

* * * * *